(12) United States Patent
Belamant

(10) Patent No.: US 12,182,774 B2
(45) Date of Patent: Dec. 31, 2024

(54) SYSTEM FOR FACILITATING PAYMENTS

(71) Applicant: ZILCH TECHNOLOGY LIMITED, London (GB)

(72) Inventor: Philip Belamant, London (GB)

(73) Assignee: ZILCH TECHNOLOGY LIMITED, London (GB)

(*) Notice: Subject to any disclaimer, the term of this patent is extended or adjusted under 35 U.S.C. 154(b) by 75 days.

(21) Appl. No.: 17/082,306

(22) Filed: Oct. 28, 2020

(65) Prior Publication Data
US 2021/0125155 A1 Apr. 29, 2021

(30) Foreign Application Priority Data
Oct. 28, 2019 (GB) ..................... 1915614

(51) Int. Cl.
| | | |
|---|---|---|
| G06Q 20/42 | (2012.01) | |
| G06Q 20/02 | (2012.01) | |
| G06Q 20/20 | (2012.01) | |
| G06Q 20/34 | (2012.01) | |
| G06Q 20/38 | (2012.01) | |
| G06Q 20/40 | (2012.01) | |
| G06Q 30/018 | (2023.01) | |
| H04L 9/32 | (2006.01) | |

(52) U.S. Cl.
CPC ......... *G06Q 20/027* (2013.01); *G06Q 20/202* (2013.01); *G06Q 20/351* (2013.01); *G06Q 20/385* (2013.01); *G06Q 20/4018* (2013.01); *G06Q 20/42* (2013.01); *G06Q 20/3829* (2013.01); *G06Q 30/0185* (2013.01); *G06Q 2220/00* (2013.01); *H04L 9/3213* (2013.01)

(58) Field of Classification Search
None
See application file for complete search history.

(56) References Cited

U.S. PATENT DOCUMENTS

| | | | | |
|---|---|---|---|---|
| 9,047,608 | B1 * | 6/2015 | Einav | G06Q 30/018 |
| 10,679,206 | B2 * | 6/2020 | Laracey | G06Q 20/36 |
| 2011/0258452 | A1 * | 10/2011 | Coulier | H04L 9/3242 |
| | | | | 713/171 |
| 2013/0238500 | A1 * | 9/2013 | Moore | G06F 21/34 |
| | | | | 705/44 |
| 2014/0108197 | A1 * | 4/2014 | Smith | G06Q 20/3223 |
| | | | | 705/26.9 |
| 2015/0019443 | A1 * | 1/2015 | Sheets | G06Q 20/322 |
| | | | | 705/71 |
| 2015/0254635 | A1 * | 9/2015 | Bondesen | G06Q 20/36 |
| | | | | 705/41 |
| 2017/0018688 | A1 * | 1/2017 | Mazed | H01L 27/14621 |
| 2017/0221059 | A1 * | 8/2017 | Sethi | G06Q 20/3224 |
| 2020/0126085 | A1 * | 4/2020 | Roche | G06Q 20/102 |

* cited by examiner

*Primary Examiner* — William J Jacob
(74) *Attorney, Agent, or Firm* — Morrison & Foerster LLP

(57) ABSTRACT

The combination of virtual payment cards (tokens) and 3D Secure to transparently transport information to an issuing authority between mutually independent transactions. Furthermore, the virtual payment card standard digital information is transformed by embedding the mandated URL/SESSION ID without the need for the card schemes, acquirers, or payment gateways to make any modifications to their system or message formats.

4 Claims, 4 Drawing Sheets

SYSTEM FOR FACILITATING PAYMENTS

FIELD OF THE INVENTION

Figure 1:
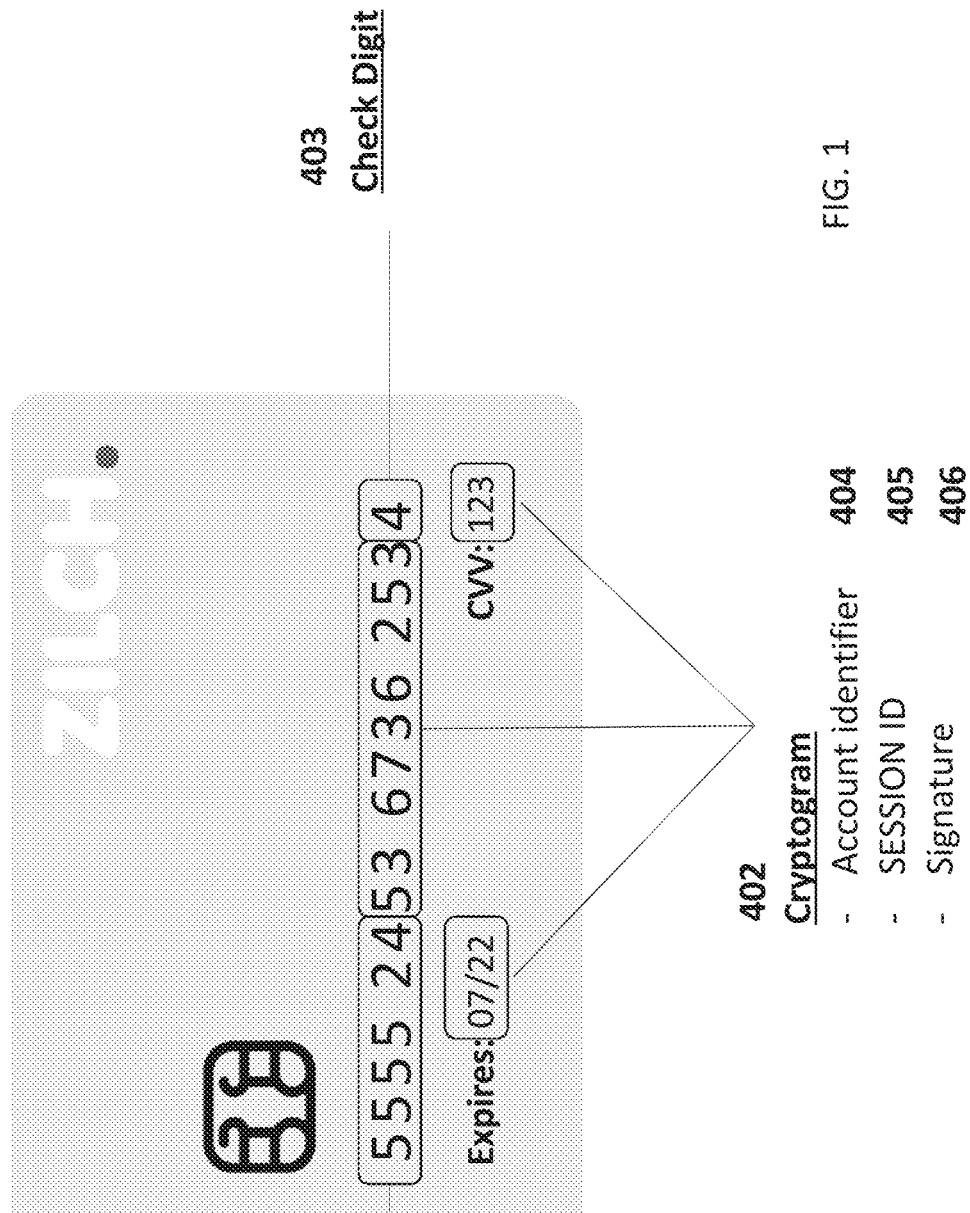

The present inventive concept relates to apparatus and methods to facilitate real-time financial transactions, especially at online point of sale (POS) transactions.

BACKGROUND TO THE INVENTION

Online consumer sales growth is facilitated by multiple channels through which customers can browse, select and purchase goods and services. Goods and services are marketed and sold through a number of mobile applications and web browsers.

In order for customers to pay for the goods and services they purchase, on-line merchants accept payment instruments such as debit and credit cards as well as well known payment methods such as PayPal®. Merchants use their own websites or those of marketplaces to sell their goods and services identifiable by their unique URL/SESSION IDs (Uniform Resource Locators) commonly called 'web addresses'.

SUMMARY OF INVENTION

The present inventive concept provides a system for facilitating an online transaction initiated by a client at an online address, the system comprising a payment token having a unique identification factor, an authorisation gateway and a data processing unit, the authorisation gateway being adapted to receive the online address and to transmit it to the data processing unit, and the data processing unit being adapted to receive the online address and the unique identification factor and to allow or deny the said transaction or require a further confirmation step based on the online address, the unique identification factor and a set of rules.

The said further confirmation step may comprise a notification to the client of certain information.

The online address may be that of a merchant (for example a retailer). An online address may comprise a Uniform Resource Locator, Uniform Resource Identifier and/or a Session ID. A Session ID may be conveyed by way of a cookie.

The inventive concept combines two elements of transaction technology to provide a new and advantageous system.

Payment tokens are widely used, but generally the unique identification factor is transmitted to an acquiring institution and subsequently to an issuing institution with only discrete data according to a standard message format. Thus, previously, an issuing institution would not receive information relating to the online address via which the online transaction is initiated by the client. For many clients and issuing institutions this is not problematic.

However, advantageous functionality can be provided when the system is adapted as described above.

For example, a requirement for an additional payment authorisation security step may be introduced. This can reduce the risk of fraudulent transactions. Furthermore, an interested party may offer benefits or incentives to the client.

Thus, a client may choose to use a particular online portal to initiate the transaction. The system can track that initiating portal to provide information thereon to the issuing institution.

It is generally understood that a client is free (given the diversity and open nature of the public internet) to choose which portal is used to initiate a transaction. A retailer's online offering may therefore be accessed by a number of different routes. If a retailer and issuing authority are able to confirm the portal used to initiate a transaction, then they can capture potential benefits from—and encourage the use of—particular portals.

Thus, a link between a transaction approval and the online address is created. Importantly, this enables an issuing authority to confirm whether a particular portal has been used to initiate a transaction.

An issuing authority might derive a benefit from this by being able to offer payment terms agreed between the issuing authority and a particular retailer or operator of a portal. A client might derive a benefit from a rebate or discount incentive. In either exemplary case, a pre-existing agreement between a retailer and issuing authority can provide a benefit to all parties—but only as long as the transaction is tracked in the way described.

For example, a particular portal may be established by an affiliate link between a retailer and issuing authority.

The payment token may be a payment card, optionally a "virtual" payment card. A virtual payment card is a set of account details which may never be manifested on a physical payment card. A payment token typically comprises an account number, expiry date and possibly further authentication information.

One advantage of offering a virtual payment card in combination with the features of the present inventive concept is additional tracking of a transaction by providing a specific token for a specific task, period, or the like.

The authorisation gateway may be a "3D Secure"® authentication or similar.

The inventive concept thus combines virtual payment cards (tokens) and 3D Secure and to transparently transport information to the issuing authority between mutually independent transactions. Furthermore, the invention transforms the virtual payment card standard digital information by embedding the mandated URL/SESSION ID without the need for the card schemes, acquirers or payment gateways to make any modifications to their system or message formats.

This enables the tracking of use of affiliate links between a retailer, issuing authority and consumer. In effect, it enables a closed loop. The inventive concept enables the issuing authority to reject a transaction if it has not been initiated through the portal required by such an affiliate link.

The invention describes how it can be used to ensure that rules set prior to transacting are enforced thus opening up a myriad of possible options or benefits that simply could not be offered otherwise.

Advantages and possible implementations of the present inventive concept will now be set out in further detail.

DETAILED DESCRIPTION OF THE DRAWINGS

FIG. 1 discloses an exemplary payment card that shows which bits of information are used to generate the cryptogram.

Figure 2:
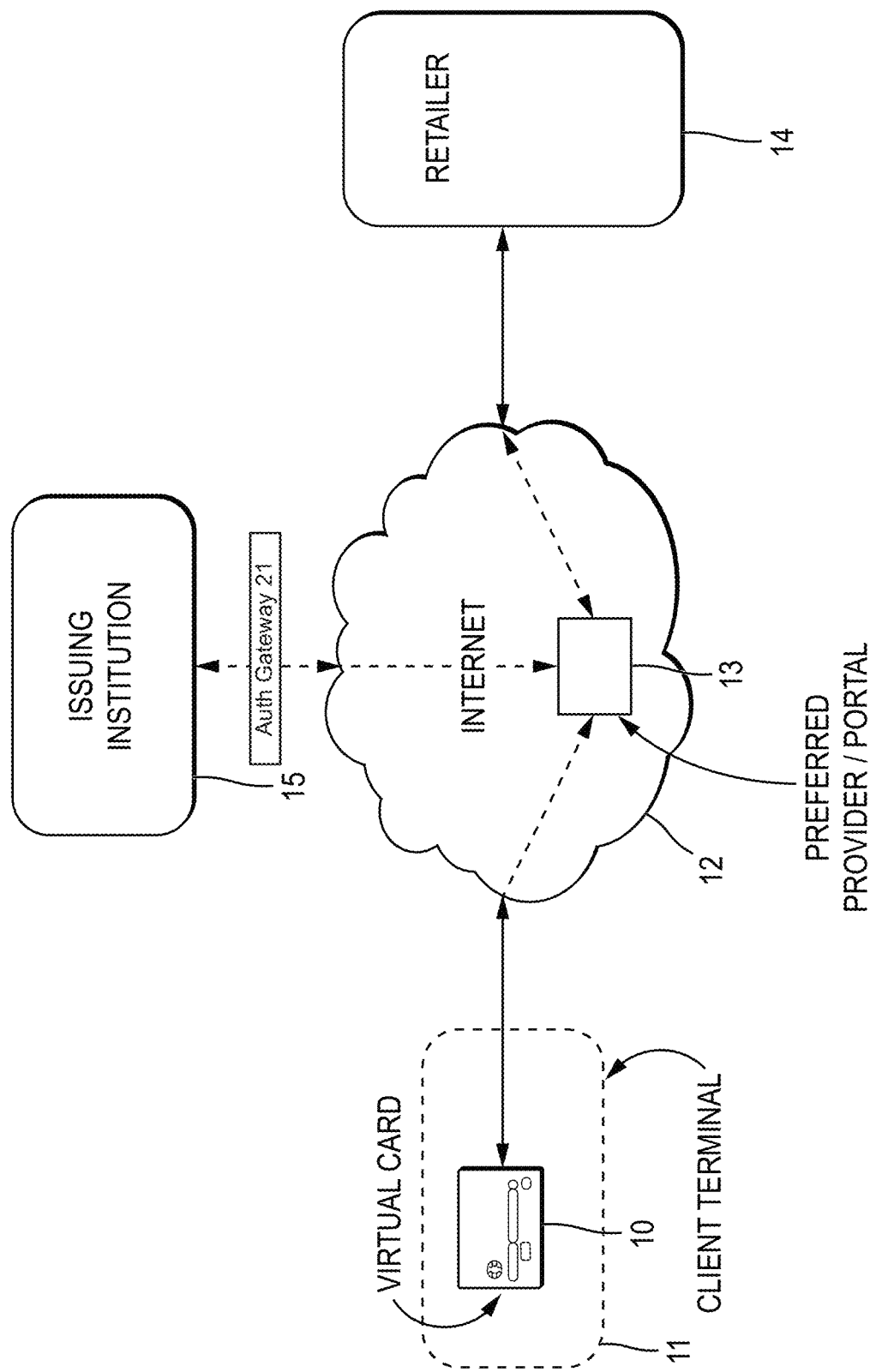

FIG. 2 is a diagram of the system for facilitating payments.

Figure 3A:
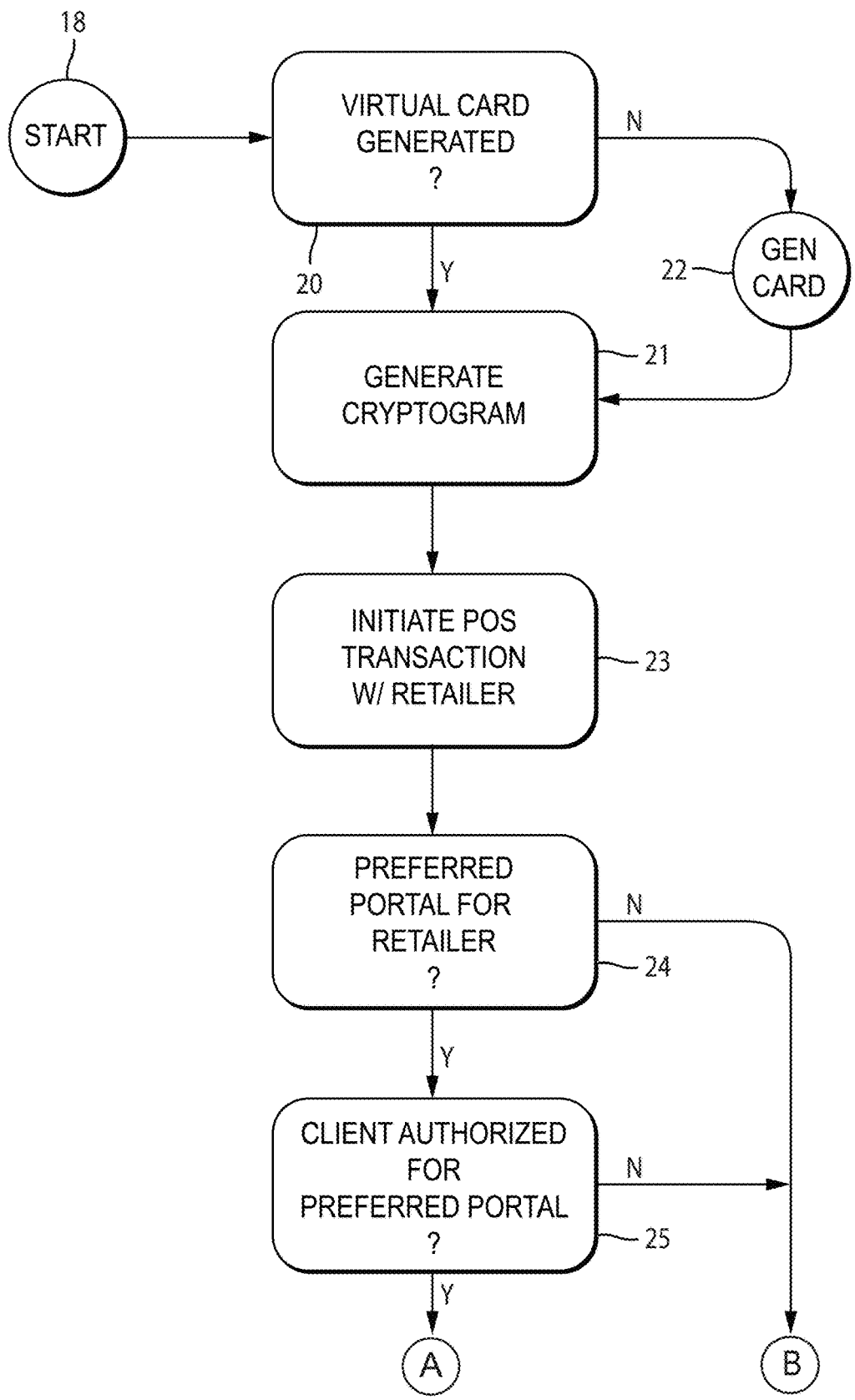
Figure 3B:
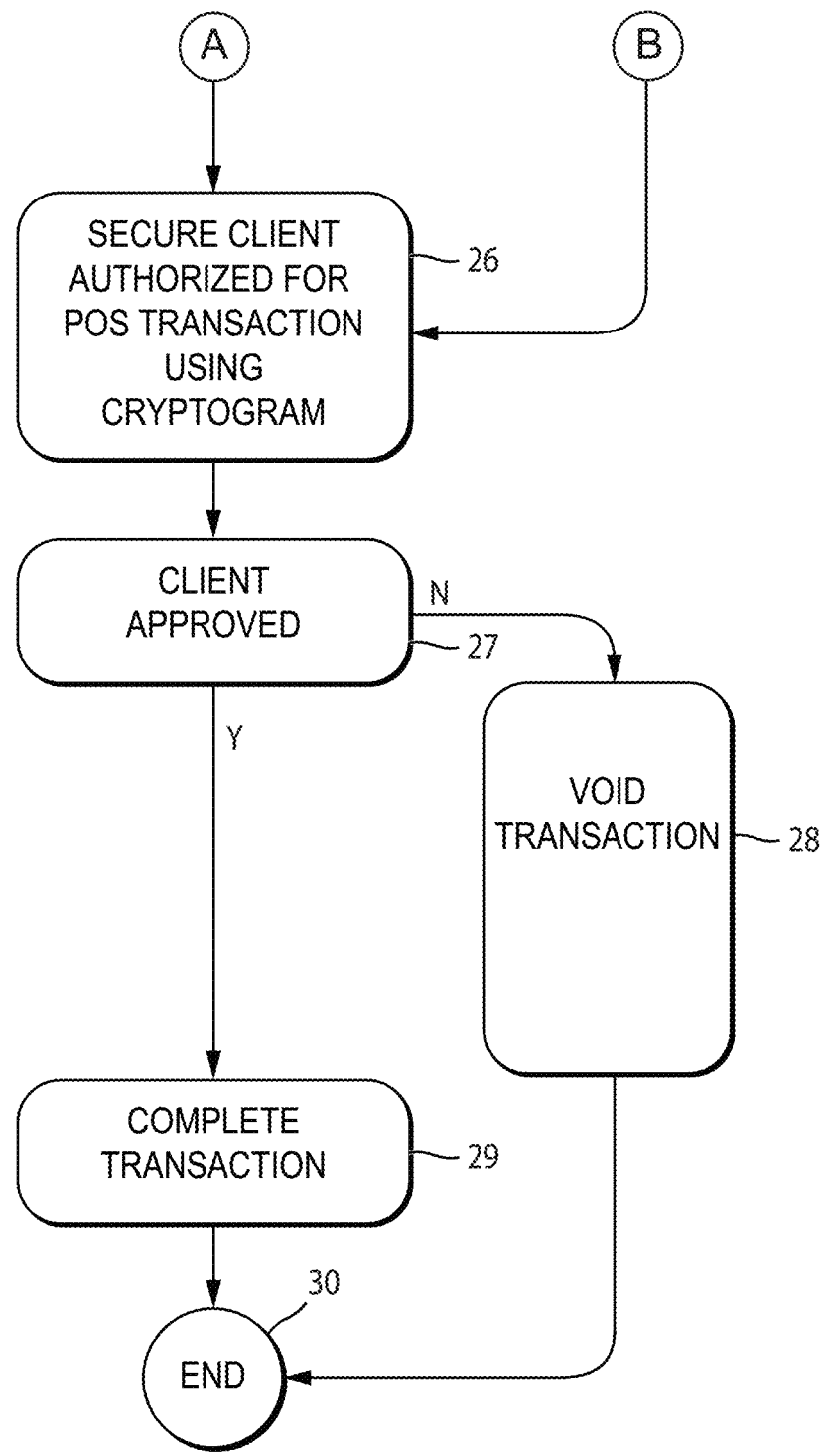

FIGS. 3A-3B disclose a method of facilitating payments as implemented by the system.

DETAILED DESCRIPTION OF THE INVENTION

In order for customers to pay for the goods and services they purchase, online merchants accept payment instruments such as debit and credit cards as well as well known payment methods such as PayPal®. Merchants use their own websites or those of marketplaces to sell their goods and services identifiable by their unique URL/SESSION IDs (Uniform Resource Locators) commonly called 'web addresses'.

When a debit or credit card is used to effect a payment instruction, the transaction information, inclusive of the amount to be paid is sent to the merchant's acquiring bank or payment gateway which then requests an authorisation from the institution that issued the credit or debit card to the transacting client (card issuer). Issuing institutions would not previously vet the URIs (Uniform Resource Identifiers) of the merchants from which transactions originate.

It is clear therefore that merchant stores can be accessed via different URL/SESSION IDs depending on the browser's clients use at various times. The access path selected is in most cases irrelevant to clients but, if required, clients always have the choice to choose the portal/URL/SESSION ID through which the merchant will be accessed. For example, a client may wish to purchase a pair of shoes via a portal that offers discounts. Such discounts are in some cases negotiated by an affiliate of the merchant concerned and can thus only be claimed by a client if the purchase is performed via the affiliate's URL/SESSION ID.

When a client accesses a merchant's URL/SESSION ID directly, only this merchant can offer a discount. When the same client purchases the goods via an affiliate of said merchant, such affiliate may be able to offer the client a discount and/or cashback based on its affiliate/merchant agreement. Clients can thus search the internet for the best discounts and purchase the goods they require via their associated website.

There are currently no known technological methods to control an authorisation based on the specific URL/SESSION ID a client may have used to make purchases. The reason for this lack of control is twofold, a) the issuing institution will generally not deny a transaction unless it does not comply with its standard financial terms (e.g. credit limit) and b) it is the client who decides from which web-site the goods will be purchased based on criteria that are not the business of issuing institutions.

The internet is an open system and thus it would be intuitively wrong to obligate clients to use specific URL/SESSION IDs to effect purchases, unless of course clients were advised beforehand that such restriction is necessary for them to access certain financial products or derive benefits. Clients therefore would decide on the URL/SESSION IDs they wished to use based on the benefits these would attract.

For example, an organisation may wish to provide short term finance to its clients but only if specific affiliate links are utilised. The credit provided may be financially beneficial to clients as the credit provider would derive income streams from the merchants with which they have concluded affiliate agreements. Without these new income streams, the credit provider may not be in a position to offer the credit line requested on preferential terms.

Clients may, inadvertently or knowingly access the merchant's website via an URL/SESSION ID that are not affiliated with the credit provider. If and when this occurs, the credit provider may wish to decline the purchaser and therefore refuse to provide the credit line requested or advise the client that the financial terms of the credit line such as interest, fees, repayment periods, etc. have changed as a result of the client's action (URL/SESSION ID selection). Thus, a notification may be made.

The previously missing link (in other words, the contribution of the present inventive concept) is that the schemes' payment authorisation function cannot be tracked as needed and the merchant is thus not aware of the agreement previously entered into by the client and the credit provider (issuing authority) regarding the use of a specific URL/SESSION ID. This lack of historical tracking might allow the client to make use of the credit provided using any URL/SESSION ID and thus bypass the credit provider's rules.

This inventive concept resolves the above dilemma elegantly by creating an trackable link between the credit approval process and the URL/SESSION ID to be utilised. This link is created when the client selects the merchant store and the goods to be purchased.

The first part of the solution is achieved by issuing a virtual card, constructed in such a way as to, on the one hand, adhere to the card schemes' format and on the other, to embed in the issuer's proprietary data fields, the URL/SESSION ID from which the goods should be acquired. This ensures that when this virtual card is utilised in the future to make a purchase, the URL/SESSION ID which was to be used is provided to the authorisation authority, in this case, the credit provider (issuing authority).

The inventive concept thus creates an irrefutable audit trail of the client's agreement embedded in the virtual card itself thus ensuring that the URL/SESSION ID information cannot be lost and can always finds its way back to the authorisation (issuing) authority.

The inventive concept further addresses the problem associated with providing the URL/SESSION ID, on which the transaction is actually being affected, to the authorising authority so that it can perform a comparison. It must be noted that previous card schemes do not and cannot currently provide this information as part and parcel of their standard ISO 8583 message formats. It was thus not previously possible for the authorisation (issuing) authority to be made aware of the URL/SESSION ID being used at the time the transaction is performed.

This inventive concept resolves this problem by utilising the 3D secure functionality as a means of obtaining the URL/SESSION ID on which the transaction is being conducted. At check-out, clients are asked to enter their 16 digit card number (PAN-primary account number), expiry date and the card verification value (CVV). Once these values have been entered, the transaction is sent for authorisation through the acquirer's system or the merchant's payment gateway. If 3D secure is mandated by the issuing institution, a 3D secure portal is activated through which the client can be identified and validated.

The 3D portal is provided by the issuing institution which can therefore derive the URL/SESSION ID being used by the client. In addition to providing additional client security, 3D secure is utilised to feed-back to the issuer, the virtual card details as well as the URL/SESSION ID where these were captured.

The authorising institution (in this case, the credit provider) can now compare the URL/SESSION IDs and either a) authorise the transaction, b) deny the transaction or/and c) advise the client via the 3D portal that the wrong URL/SESSION ID is being used thus allowing the client to take remedial action.

FIG. 1 shows an exemplary payment card in line with EMV standards, and shows how specific data can be embedded into a cryptogram and repurposes the result to look and function as a standard EMV token. Thus, a process where a scheme issued BIN 401 is combined with a system generated cryptogram comprising 16 digits (making use of public/private key pair) generated using identification and authentication data such as, but not limited to an account identifier 404, session ID 405, a signature 406 generated with the customers private key, and a check digit make up what would traditional be known as a PAN, CVV and Expiry date.

FIG. 2 shows the system for facilitating payment of the by using the exemplary payment card of FIG. 1. As discussed above, the client terminal 11 which houses the a data processing unit uses the information on the payment card to generate a virtual card 10 including the cryptogram described above and then initiate a financial transaction session for that particular payment card. This can be done at a client terminal 11. The financial transaction session then contacts the retailer 14, either by standard internet 12 or by a preferred portal provider 13 to initiate the financial transaction with the retailer 14. The retailer 14 contacts the issuing institution 15 to ensure that the card is authorized for the transaction, and if so, proceeds with completing the transaction. If the issuing institution 15 fails to provide sufficient authorization for the card used, the retailer 14 can void the transaction and then notify both the issuing institution and the user that the transaction has been voided. If proper authorization is granted by the issuing institution 15, the retailer then approves and completes the transaction. In either situation, tracking information is generated.

FIGS. 3A-3B show the method for facilitating payment as executed by the system of FIG. 2. In FIG. 3A, the method begins with an initiation step 18 of a transaction by the client. First, a check 20 is made to see there is any pre-existing virtual card information that can be used for this session. If yes, then cryptogram is generated 21. If no, then the virtual card information is generated 20 and then the cryptogram is generated 21. In the next step, the client contacts the retailer to initiate a POS transaction 23. Then then client either checks for or is informed of a preferred portal that can used for this transaction as discussed above 24. If yes, then a further check is executed to see if this client is authorized to use this preferred portal 25 and the client can take advantage of the special benefits associated with using that preferred portal with the retailer. If no, then the client is not allowed to use the portal. The next step is to secure client authorization for the POS transaction with this retailer by verifying the cryptogram 26. If the client is approved for this transaction 27, then the transaction is completed 29. If the client is not approved for this transaction, the transaction is voided 28. In both instances, this is the end of this method 30.

It is to be understood that the system and method for facilitating payments is not limited to the specific embodiments described above but encompasses any and all embodiments within the scope of the generic language of the following claims enabled by the embodiments described herein, or as otherwise shown in the drawings or as described above in terms sufficient to enable one of ordinary skill in the art to make and use the claimed subject matter.

The invention claimed is:

1. A system for facilitating an online transaction initiated by a client at an online address, the system comprising one or more processors and memory storing instructions executable by the one or more processors to cause the system to:
generate a payment token, originating at a client terminal, having a unique identification factor wherein said unique identification factor is a generated 16 digit cryptogram and comprises at least an account number and an expiry date and embedded further authentication information comprising a portal URL and a session ID;
transmit, by an authorisation gateway to a data processing unit associated with an authorizing institution system, the 16 digit cryptogram, wherein transmitting the 16 digit cryptogram embedding the portal URL and the session ID complies with standard ISO 8583 messaging formats;
receive, by the data processing unit, the online address and the unique identification factor; and
determine, by the data processing unit, whether to:
allow the transaction;
deny the transaction; or
require a further confirmation step;
wherein the determination by the data processing unit is based on the online address, the unique identification factor and a set of rules.

2. A system according to claim 1, wherein said further confirmation step comprises a notification to the client of predetermined information.

3. A system according to claim 1, wherein a link between a transaction approval and the online address is created.

4. A method for facilitating an online transaction at an online address, comprising the steps of:
at check-out, entering 16 digit card number (PAN-primary account number), expiry date and the card verification value (CVV) to generate a 16 digit cryptogram, the 16 digit cryptogram comprising at least an account number and the expiry date and embedded further authentication information of a portal URL or a session ID;
transmitting, by an authorization gateway, to a data processing unit associated with an authorizing institution system, the 16 digit cryptogram, wherein transmitting the 16 digit cryptogram embedding the portal URL and the session ID complies with standard ISO 8583 messaging formats; and
determine, by the data processing unit, whether to:
allow the transaction;
deny the transaction; or
require a further confirmation step;
wherein the determination by the data processing unit is based on the online address, the unique identification factor and a set of rules.

\* \* \* \* \*